Jan. 14, 1958  M. H. BESTER  2,820,136
METHOD FOR RESISTANCE WELDING BLIND LOCATIONS
WITH EXPENDABLE ELECTRODES
Filed March 2, 1956
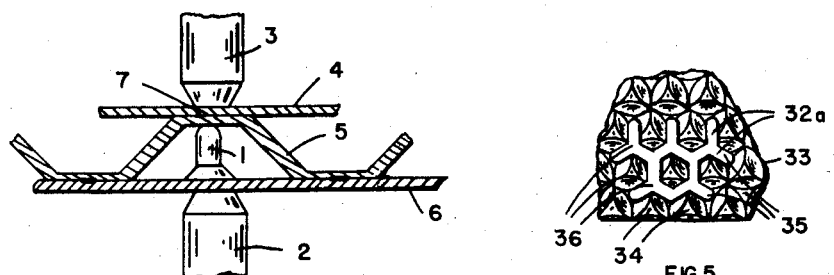
FIG. 1
FIG 5
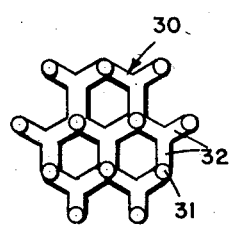
FIG. 2
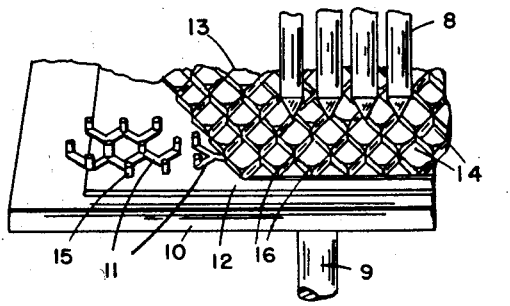
FIG. 3
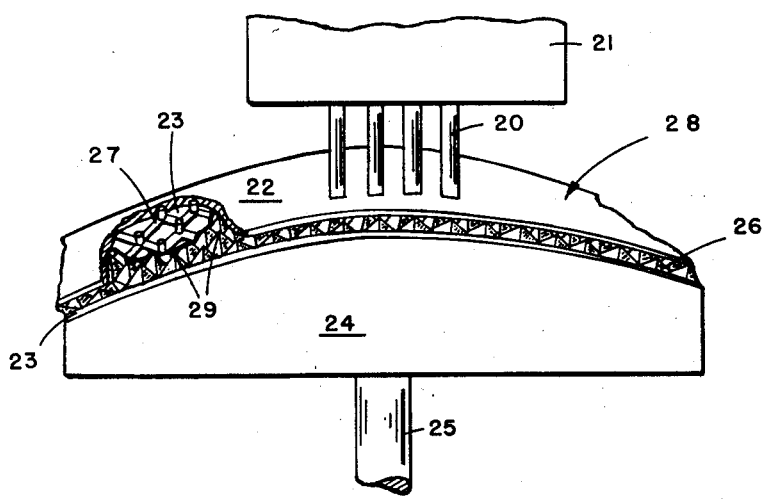
FIG. 4
*INVENTOR.*
MONROE H. BESTER
BY
*William R Lane*
ATTORNEY

United States Patent Office 2,820,136
Patented Jan. 14, 1958

2,820,136
METHOD FOR RESISTANCE WELDING BLIND LOCATIONS WITH EXPENDABLE ELECTRODES

Monroe H. Bester, Whittier, Calif., assignor to North American Aviation, Inc.

Application March 2, 1956, Serial No. 569,104

8 Claims. (Cl. 219—117)

This invention relates to a method for resistance welding blind locations with expendable electrodes and, more particularly, to a process for fabricating a metal sandwich.

In the fabrication of sheet metal structures by resistance welding, frequently welds are required at locations where direct access is impossible to one of the metal faces by one of the welding electrodes. This problem exists particularly in the aircraft industry where the need for light weight structures, capable of withstanding high operating temperatures, has stimulated efforts toward fabrication of stainless steel sandwich structures for skins, bulkheads, and other airframe members.

Several advantages are realized in stainless steel sandwich structures made by resistance welding. First, resistance welding, under adequate control, offers a rapid, dependable method of attachment; second, reliable welds in properly designed structures permit load transfer with no restriction in operating temperature other than that imposed by the parent metal; and third, heat affected zones are restricted for minimum effect on the parent metals.

The present invention is specifically desirable for use in fabricating the waffle type sandwich. The waffle type sandwich consists of two sheet metal plates having a metal core which has depressions and raised portions similar to those of a waffle. With waffle type cores, no difficulty is encountered in attaching the first facing sheet to the waffle by resistance welding. Attachment of the second sheet, however, offers considerable difficulty. The weld required to do this is referred to as a blind weld where no access to the weld area is possible from the core side. In attempting to weld the second sheet to the waffle, it was found that the electrode pressures necessary for producing a satisfactory weld were much in excess of what the core could support and, consequently, caused the collapse of the structure. Further, the structure adjacent to the weld was overheated because of long, poorly conductive current paths.

These problems were solved in the present invention by the employment of expendable electrodes in the core. These electrodes have two functions. The first is to support the core to prevent collapse during the application of the necessary welding pressure, and the second is to afford a low resistance current path to the blind location where a resistance weld is necessary.

It is therefore an object of this invention to provide an improved method for resistance welding blind locations.

A principal object of this invention is to provide a method for fabricating an improved metal sandwich structure.

It is a further object of this invention to provide a new method for fabricating metal sandwich structures by welding blind locations with two expendable electrodes.

Another object of this invention is to provide expendable electrodes, either singly or in grids, for use in the aforesaid welding process.

Other objects of this invention will become apparent from the following description taken in connection with the accompanying drawings, in which Fig. 1 is a view of the two welding electrodes in position to weld a blind location through the current path provided by an expendable electrode;

Fig. 2 is a plan view of a number of expendable electrodes linked together to form a grid;

Fig. 3 is a view of a gang welder in position to weld the core to the lower sheet metal face of a sandwich;

Fig. 4 is a cutaway view showing the fabrication of a curved sandwich in which the waffle core is being gang-welded to the upper metal sheet through the current path provided by the expendable electrodes;

And Fig. 5 is a view of the lower side of a sandwich core, similar to those shown in Figs. 3 and 4, with a grid having its expendable electrodes extending into the raised portions of the core.

Referring to Fig. 1, expendable electrode 1 is in position to provide support for core 5 which is to be welded to upper sheet 4. Expendable electrode 1 also provides a low resistance current path between welding electrodes 2 and 3 to the blind location 7. Core 5 has been previously welded to lower sheet 6 with expendable electrode 1 in its present position. Expendable electrodes are made in large clusters, shown in Figs. 2 and 3, and are normally cast in aluminum or copper depending upon the material of which the sandwich is made. Aluminum electrodes are used for sandwiches made of stainless steel, titanium and low-alloy or carbon steel, and copper electrodes are used for aluminum sandwiches.

Fig. 2 shows a typical grid or cluster 30 of expendable electrodes 31 which are connected by links 32. Electrodes 31 are substantially perpendicular or vertical in reference to the plane of links 32, said plane being indicated to be approximately horizontal.

The electrodes are preferably of such height from the base of the links so that the upper end of the electrodes contact the raised portions of the waffles. The bases of the links rest on the lower sheet of the sandwich and are arranged, as shown in Fig. 5, so that they are not under the low point or nadir 34 of each of the waffle sections. This allows the nadirs to be in contact with the lower sheet. The above is accomplished in the triangular type waffle, shown in Figs. 4 and 5, by having the links connected to each other at points below intersections 36 of the waffle triangles and at other points directly below raised portions, or vertices, 35 of the aforesaid triangles. Intersections 36 occur at a level in between the nadirs 34 and vertices 35, and lateral openings occur through the core above and below the intersections. Thus, the low points on the links are made to be at the same level as the nadirs of the core when the upper end of the electrodes are extending up into the wertices 35.

The configurations of the waffle sections in the core can be of varying shapes, such as quadrilateral, shown in Fig. 3. The grids of electrodes must be made to follow the pattern of the waffle, but this is a simple matter.

Referring to Fig. 3, in which a gang welding operation is shown, upper gang welding electrodes 8 and lower welding electrode 9 are positioned to resistance weld core 13, at its lower contacts or depressions 14, to lower sandwich face 12. Copper plate 10 is connected to electrode 9 to form one integral lower electrode. Previous to the above welding operation, a cluster or clusters of expendable electrodes 11 are placed on sheet 12 and waffle core 13 is placed on vertical portions 15 of clusters 11 so that portions 15 are in contact with raised or upper portions 16 of core 13.

In Fig. 4, gang-welder 20, held in upper welding head 21, is shown positioned to weld upper face 22 of curved sandwich 28 to raised portions 29 of waffle core 26. Previous to this operation, core 26 is welded to lower sheet 23 with expendable electrode clusters 27 in place as indicated in the description of Fig. 3, above. As indicated in reference to Fig. 1, the expendable electrodes are shown in position to carry the current and to provide support in the welding operation. The cutaway portion shows both the configuration of the waffle core and the clusters of expendable electrodes. Lower sandwich plate 23 is resting on curved mandrel-electrode 24 which is integral with electrode 25. Welding electrodes 20 and 25 are secured to an ordinary resistance welding machine which must be constructed so as to be able to move along a predetermined path so that the upper electrodes will contact the proper locations directly above the expendable electrodes and the raised portions of the core.

In operation, the first step in this process is to clean the parts that are to be resistance welded. This is generally done in an acid solution. Next, the sheet which is to form the bottom face of the sandwich is secured to a holding fixture, not shown, which is part of the lower welding electrode, and which has a flat or curved configuration, depending upon the desired shape of the fabricated sandwich. After the bottom facing sheet is secured, the expendable electrode grids or clusters are placed thereon. These grids or clusters of electrodes can be made in any practical size, and to reduce handling, they should be made as large as possible. When the expendable grids are properly arranged, the waffle core of the sandwich is placed on them in the proper position to provide the support and the path for the current directly under the raised portions of the core. The core is then welded to the bottom facing sheet at the points where the depressions of the core contact the lower sheet, and this is done with a gang resistance welder to expedite the process. After the first welding operation is completed, the top facing sheet of the sandwich is placed over the core and is secured thereon, by clamp or other means, in preparation for the next resistance welding operation. The upper welding electrodes must then be arranged to contact upper sheet at points just above the raised portions of the core and above the expendable electrodes. The upper welding electrodes are on a carrier capable of being moved to new locations for the succeeding welds in a manner so that each movement of the carrier will properly locate the gang-electrodes just above the raised portions of the core and the expendable electrodes.

When the welding operations have been completed, the sandwich is removed from the welder and the expendable electrodes are removed from the sandwich by one of several methods or a combination thereof. In one method, a relatively low temperature electrode is used and can be melted out by heating the sandwich. However, the preferred method of removing the electrodes is by chemical action. Depending upon the materials of which the expendable electrodes and the sandwich are made, the sandwich is placed in such solutions as caustic soda or nitric acid and the electrodes are chemically dissolved. The electrodes can be dissolved completely or can be dissolved to a point where they are small enough so that they can be shaken out of the sandwich through the openings in the core.

If a welding machine does not have an automatic feeding means for locating the points where the blind welds are to be made, a template can be used to mark the location of the blind welds on the upper sheet of the sandwich. The accuracy of these locations is not as critical as might be expected because a relatively large overlap portion is provided on each welding electrode and this allows for as much as ⅛" error in welding location. It is relatively easy to place the upper electrode within ⅛" of the proper location for the blind weld.

In this process, the expendable electrodes serve as both current conductor and mechanical support during the weld. The zone of highest resistance in this circuit is at the blind weld interface and for this reason, fusion with subsequent nugget formation begins here. The design of the expendable electrode is based on the following considerations:

(1) To minimize the proportion of the weld energy dissipated in the electrode, a low resistivity material with adequate section size must be employed. (The welder output must be advanced to compensate for the energy dissipated in the expendable electrode.)

(2) The electrode must have sufficient hot strength to prevent compressive yield of more than a few thousandths of an inch during the weld cycle.

(3) The electrode material must be a metal or alloy that can be readily dissolved by a chemical solution to which the sandwich parts are relatively inert.

When the sandwich is made of stainless steel or titanium, aluminum expendable electrodes are employed and a caustic solution is used to remove these electrodes. The chemical action on the stainless steel is insignificant. When the sandwich is made of aluminum, copper or copper alloy expendable electrodes are used and these electrodes are removed in a bath of nitric acid and/or other appropriate acid mixtures.

Considered generally, the present invention thus provides a method to make blind resistance welds where the heat and pressures necessary for fabrication would otherwise damage the structures. Specifically, it provides a method for the fabrication of waffle type sandwich structures which in the past have been very difficult to manufacture satisfactorily.

Although the invention has been described and illustrated in detail, it is to be clearly understood that the same is by way of illustration and example only and is not to be taken by way of limitation, the spirit and scope of this invention being limited only by the terms of the appended claims.

I claim:

1. The process of fabricating a metal sandwich comprising placing supports on a first metallic member forming one face of the sandwich; placing a sandwich core on said supports; means on said core to lock said supports between said core and said first member; welding said core at the locations of said depressions to said first metallic member; placing a second metallic member, forming the other face of the sandwich, on said core; welding the raised portions of said core to said second metallic member at locations where said supports contact said core; and removing said supports from said sandwich.

2. The process of fabricating a metal sandwich comprising placing supporting expendable electrodes on a first metallic member forming one face of the sandwich; placing a metallic sandwich core, having three-dimensional depressions and three-dimensional raised portions, on said electrodes so that said raised portions lock said support between said core and said first member; resistance welding said core at the locations of said depressions to said first metallic member, placing a second metallic member on said core, said second member forming the other face of said sandwich, resistance welding the raised portions of said core to said second metallic member at locations where said electrodes contact said core, and removing said electrodes from said sandwich.

3. The process of fabricating a metal sandwich comprising placing supporting expendable electrodes on a first metallic member forming one face of the sandwich, placing a metallic sandwich core on said electrodes, said core having depressions and raised portions, resistance welding said core at the locations of said depressions to said first metallic member, placing a second metallic member on said core, said second member forming the other face of said sandwich, resistance welding the raised portions of said core to said second metallic member at locations where said electrodes contact said core, and removing said electrodes from said sandwich by melting, the melting point of said electrodes being lower than that of said sandwich.

4. The process of fabricating a metal sandwich comprising placing supporting expendable electrodes on a first metallic member forming one face of the sandwich, placing a metallic sandwich core on said electrodes, said core having depressions and raised portions, resistance welding said core at the locations of said depressions to said first metallic member, placing a second metallic member on said core, said second member forming the other face of said sandwich, resistance welding the raised portions of said core to said second metallic member at locations where said electrodes contact said core, and selectively dissolving said electrodes out of said sandwich.

5. The process of fabricating a metal sandwich comprising placing supporting expendable electrodes on a first metallic member forming one face of the sandwich, placing a metallic sandwich core on said electrodes, said core having depressions and raised portions, resistance welding said core at the locations of said depressions to said first metallic member, placing a second metallic member on said core, said second member forming the other face of said sandwich, resistance welding the raised portions of said core to said second metallic member at locations where said electrodes contact said core, partially dissolving said electrodes, and shaking the partially dissolved electrodes from said sandwich.

6. The process of fabricating a metal sandwich comprising clamping a first metal sheet to a holding fixture, said first sheet forming one face of the sandwich, placing clusters of expendable electrodes on said first sheet; placing a metal, waffle-shaped sandwich core on said electrodes; said core having alternate depressions and raised portions, resistance welding said core at the locations of said depressions to said first sheet, placing a second metal sheet on said core, said second sheet forming the other face of said sandwich; supporting said raised portions with said electrodes to provide a low resistance current path through said second sheet, said raised portions, said expendable electrodes and said first sheet; resistance welding the raised portions of said core to said second sheet at locations where said low resistance current path is made with said second sheet, and dipping said sandwich in a chemical bath, said bath adapted to chemically selectively dissolve said electrodes.

7. A method of resistance welding sheet metal structures where access is possible with only one welding electrode comprising placing a first metallic member on the electrode which has no access to the structures to be welded, placing a support on said first metallic member, three-dimensionally enclosing and confining said support by placing a first structure to be welded on said support, placing a second structure to be welded on said first structure, welding said first structure to said second structure through the current path made available by said support, and removing said support from within said first structure.

8. A grid of expendable electrodes to provide a current path and a welding support to the raised portions of a waffle sheet, comprising substantially vertical members and substantially horizontal links interconnecting said vertical members, said members extending upward from said links and being spaced to fit into the top of raised portions in a waffle sheet and being of a height approximately coincident with the height of raised portions in a waffle sheet, said links being positioned to extend between said members adjacent to and at the approximate level of the nadirs of the depressed portions of said waffle sheet.

References Cited in the file of this patent

UNITED STATES PATENTS

| 1,042,885 | Budd et al. | Oct. 29, 1912 |
| 2,324,435 | Smith | July 13, 1943 |